(No Model.) 2 Sheets—Sheet 1.
W. B. PHINNEY.
MACHINE FOR HANDLING CONFECTIONERY.
No. 583,604. Patented June 1, 1897.
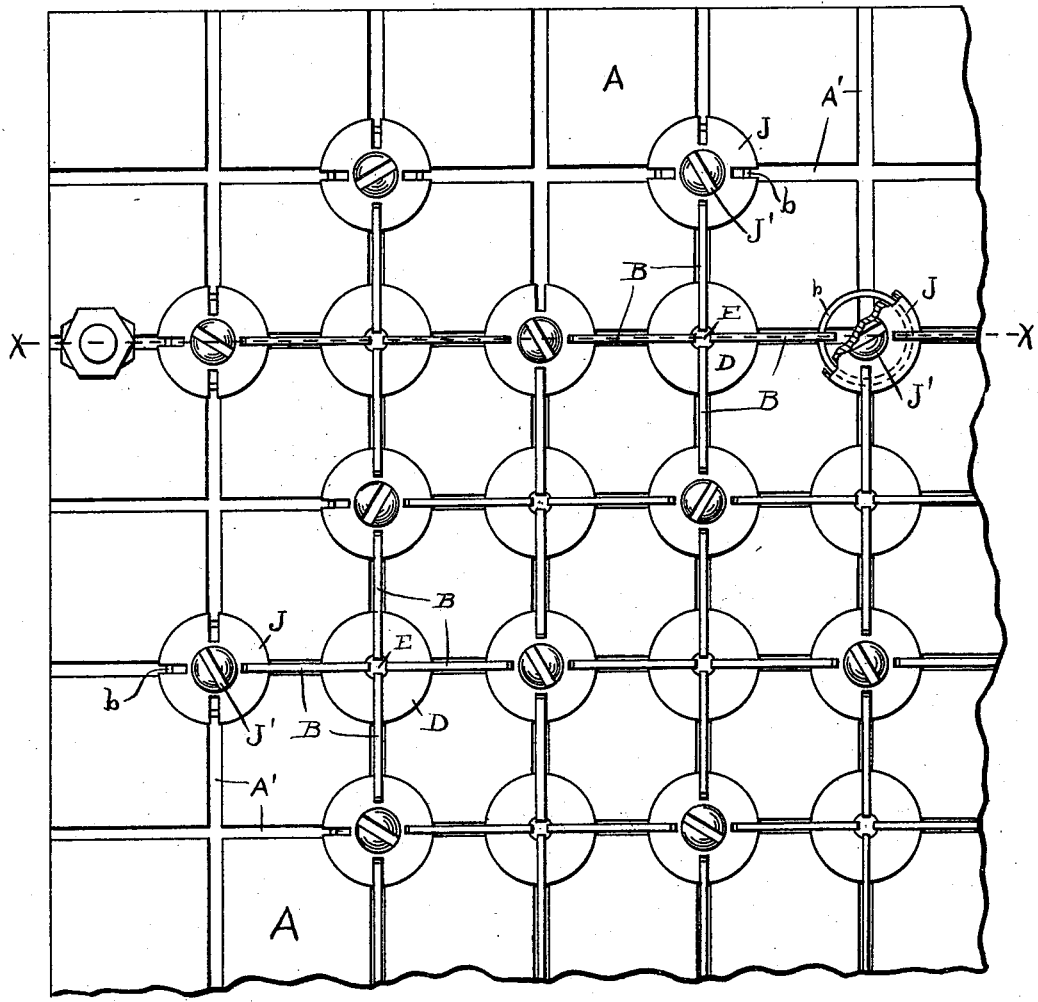

(No Model.)  2 Sheets—Sheet 2.
W. B. PHINNEY.
MACHINE FOR HANDLING CONFECTIONERY.
No. 583,604. Patented June 1, 1897.
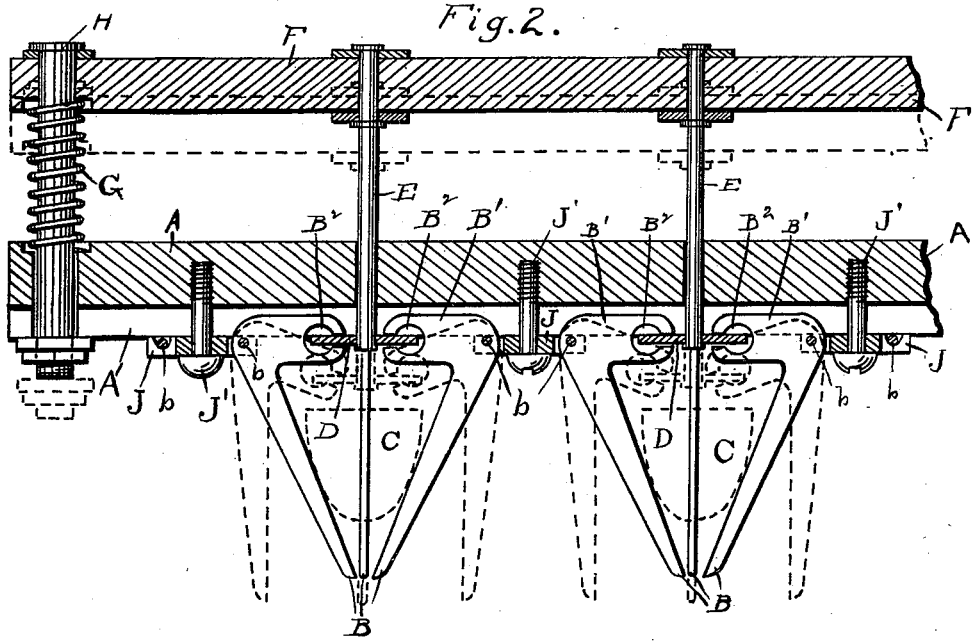
Witnesses:  Inventor,
Thomas Durant  William B. Phinney
J. M. Fowler Jr  by Church & Church
  his atty's.

UNITED STATES PATENT OFFICE.

WILLIAM B. PHINNEY, OF SILVER CREEK, NEW YORK.

MACHINE FOR HANDLING CONFECTIONERY.

SPECIFICATION forming part of Letters Patent No. 583,604, dated June 1, 1897.

Application filed April 25, 1896. Serial No. 589,107. (No model.)

*To all whom it may concern:*

Be it known that I, WILLIAM B. PHINNEY, of Silver Creek, in the county of Chautauqua and State of New York, have invented certain new and useful Improvements in Machines for Handling Confectionery; and I do hereby declare the following to be a full, clear, and exact description of the same, reference being had to the accompanying drawings, forming a part of this specification, and to the reference-letters marked thereon.

My present invention has for its object to provide devices adapted for handling small articles and lifting the same from a support on or in which they are spaced at regular distances apart, and particularly for use in removing candies or candy-cream centers from the starch molds in which they are made, but which devices are also capable of other uses; and to these and other ends the invention consists in certain improvements and combinations of parts, all as will be hereinafter described and the novel features pointed out in the claims at the end of this specification.

In the accompanying drawings, Figure 1 is a bottom plan view of a portion of a plate or support with my invention applied thereto; Fig. 2, a longitudinal sectional view on the line $x\ x$ of Fig. 1.

Similar reference-letters in the two figures indicate similar parts.

In carrying out my invention I provide a plate or support A, having mounted upon it a series of fingers or arms B, in the present embodiment arranged in sets of four, the outer or operating ends of said fingers of each set being adapted to move toward each other, so that the space between them may be occupied by a small article, such as a candy-mold C, (shown in dotted lines in Fig. 2,) the said arms being of such width that they may be inserted into the mass of material, such as starch, while they are separated, as in dotted lines, Fig. 2, then brought together with their ends beneath the article, as the mold C, supported in said starch, the arms then brought together, as in full lines in said figure, and the support lifted, carrying with it the candies supported by the arms and allowing the material of the mold, as starch, to fall away from the candy. Each of the fingers B in the present arrangement is constructed, preferably, of sheet metal and in the shape of a bell-crank lever pivoted at $b$, the shorter arms B′ projecting toward each other in pairs, as do the fingers B, and at the inner ends of the short arms are provided recesses B², open toward the ends for the accommodation of the edge of a head or disk D, one of which is provided for each set of four fingers or arms, the said disk being attached to the end of a rod E, secured at its upper end to a plate or support F, capable of movement toward and from the support A, and in the present arrangement moved from said support by one or more springs G, encircling suitable steadying pins or bolts H, attached to the plate F and passing through the support A, as shown at the left in Fig. 2. Any suitable number of these sets of picking-fingers may be employed upon the support A, and, as the latter may vary in size, any number of springs and bolts H may be employed that may be deemed necessary.

As a means for readily securing the picking-fingers to the support A and securing their proper operation I provide said support with two series of slots A′ in its under face, extending at right angles to each other, the rods E passing through the support A at the intersection of the slots A A′—that is to say, directly over the points where the arms B′ of the fingers converge—and the fingers themselves are pivoted upon the rings $b$, preferably of wire, held against the lower face of the support A by grooved washers J, fastened by screws J′, entering the plate A, these rings and washers being located at the intersection of two of the grooves A′, as shown in Fig. 1, whereby each ring will form the pivotal point for four of the fingers B, and also one disk will serve as the operating means for one set, consisting of four fingers.

The support A may be of any suitable material, but is preferably a metal plate, and the grooves are planed or milled out, thereby affording a firm bearing for the sides of the arms B′ on the inner ends of the fingers, but obviously the fingers could be attached in any other suitable manner. The fingers are preferably stamped out of sheet metal and the parts are all so made as to be readily assembled by an unskilled operator, the grooves in the plate A being made at such distance apart as will suit the molds or other devices with which the device is to coöperate.

This device is capable of being used in an automatic machine and also of being manipulated by hand, the operator in the latter instance grasping the plates A and F at the edges and forcing them together to open the fingers and allowing the springs to separate the plates and close the fingers over the candies in the molds, or, if desired, the parts could be otherwise manipulated, so that their relative movements would cause the opening and closing of the fingers.

I claim as my invention—

1. In a device for handling confectionery, the combination with a support and a series of sets of fingers pivoted on the support, the fingers of each set adapted to converge toward a common center, of a series of movable stems, a head on each stem coöperating directly with several of the fingers by a loose connection, and means for moving the stems simultaneously toward and from the support, thereby causing the opening and closing of the fingers, and enabling a series of pieces of confectionery to be grasped and manipulated, substantially as described.

2. In a device for handling confectionery, the combination with the support, and a series of sets of fingers pivoted thereon, the fingers of each set adapted to converge toward a common center and having recesses on one side of their pivot, of a series of movable stems, each having a head thereon coöperating with the recesses in several of the fingers, and means for moving said stems relatively to the support, thereby causing the simultaneous opening and closing of the fingers and enabling a series of pieces of confectionery to be grasped and manipulated, substantially as described.

3. In a device for handling confectionery, the combination with the support, and a series of sets of fingers pivoted thereon, the fingers of each set adapted to converge toward a common center, and each having an arm provided with a recess, of a series of movable stems extending through the support, one for each set of fingers, and a head on the stem engaging the recesses in the finger-arms, and means for simultaneously moving all of the stems through the support, thereby causing the movement of the fingers on their pivots, and enabling them to grasp and hold a series of regularly-spaced pieces of confectionery, substantially as described.

4. The combination with the support, having channels therein, of a series of fingers arranged in said channels, a ring on which two or more of the fingers are pivoted, securing devices for the ring, and means for causing the movements of the fingers on the rings as pivots, substantially as described.

5. The combination with the support having two series of channels therein crossing each other at an angle, of a set of fingers arranged in the channels, the rings on which the fingers are pivoted, securing devices for the rings, and means for causing the movements of the fingers on the rings, as pivots, substantially as described.

6. The combination with the support having two series of channels therein crossing each other at an angle, of a series of sets of fingers arranged in the channels, a series of movable stems, each having a head engaging a set of fingers and arranged at the intersection of two channels, a series of rings arranged at the intersection of other grooves on which the fingers of different series are pivoted, securing devices for the rings, and means for causing the movements of the fingers on the rings, as pivots, substantially as described.

7. The combination with the support A, having an aperture through it, a set of fingers B having the arms B' with recesses B², of the stem E having the head D engaging the recesses B², a plate, as F, to which the stem is connected, said support A and plate F being movable toward and from each other, substantially as described.

8. The combination with the support having two series of channels therein, two or more series of fingers in sets of four arranged in the channels and pivoted to the support, of a series of stems, one for each set of fingers, having heads thereon, a movable plate, as F, connected to the stems, springs for separating the plate and support, and stops for limiting their movement, substantially as described.

9. The combination with the support having two series of channels therein, two or more series of fingers in sets of four arranged in the channels, and having the recesses, and the rings secured to the support at the intersection of the channels, of the movable plate, the stems thereon, having the heads engaging the recesses in the fingers, the springs between the movable plate and support, and stops for limiting the relative movements of the support and plate, substantially as described.

10. In a device for handling confectionery, the combination with the support A, a series of sets of fingers B pivoted thereon having the arms B' and recesses B², the fingers of each set being adapted to converge, of the plate F, springs between it and the support, and the stems E having heads D coöperating with the recesses B² in the arms B', substantially as described.

11. In a device for handling confectionery, the combination with a support, as A, of a set of fingers B pivoted thereon adapted to converge at a common center, and having the arms B' provided with recesses B², of the stem E having the head D coöperating with the recesses in the arms B', and a spring for moving the stem relatively to the support, thereby causing the movement of the fingers on their pivots, substantially as described.

12. In a device for handling confectionery, the combination with the support A, of a set of fingers pivoted thereon and arranged to converge at a common center, of a stem extending through and guided in said support having a head positively engaging the fingers on one side of the pivot and at the center of the set for causing their positive operations on their pivots toward and from each other, and a spring for moving the stem in one direction, substantially as described.

WILLIAM B. PHINNEY.

Witnesses:
W. H. MERRITT,
M. L. BARBEAU.